US009013577B2

(12) United States Patent
do Carmo Miranda

(10) Patent No.: US 9,013,577 B2
(45) Date of Patent: *Apr. 21, 2015

(54) INTEGRATED ANTENNA SYSTEM FOR IMAGING MICROSATELLITES

(71) Applicant: Skybox Imaging, Inc., Mountain View, CA (US)

(72) Inventor: Henrique do Carmo Miranda, Stanford, CA (US)

(73) Assignee: Skybox Imaging, Inc., Mountain View, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/935,770

(22) Filed: Jul. 5, 2013

(65) Prior Publication Data

US 2014/0015970 A1 Jan. 16, 2014

Related U.S. Application Data

(63) Continuation of application No. 13/566,548, filed on Aug. 3, 2012, now Pat. No. 8,482,610, which is a continuation of application No. PCT/US2011/064998, filed on Dec. 14, 2011, application No. 13/935,770, (Continued)

(51) Int. Cl.
*H04B 7/185* (2006.01)
*H04N 7/00* (2011.01)
(Continued)

(52) U.S. Cl.
CPC .............. *H04N 7/005* (2013.01); *B64G 1/1021* (2013.01); *H01Q 1/08* (2013.01); *H01Q 1/288* (2013.01);
(Continued)

(58) Field of Classification Search
None
See application file for complete search history.

(56) References Cited

U.S. PATENT DOCUMENTS 3,073,040 A 1/1963 Schueller
3,434,255 A 3/1969 Rabenhorst
(Continued)

FOREIGN PATENT DOCUMENTS

EP 0226577 7/1987
FR 2 374 754 7/1978
(Continued)

OTHER PUBLICATIONS

Petrie, Gordon, "An Alternative Source of Very High-resolution Imagery: The Resurs-DK1 Satellite," GEOInformatics, vol. 13, Apr./May 2010, pp. 30-34.

(Continued)

*Primary Examiner* — Sath V Perungavoor
*Assistant Examiner* — Kate Luo
(74) *Attorney, Agent, or Firm* — Dority & Manning, P.A.

(57) ABSTRACT

Examples of imaging microsatellites are described that have an imaging system and antenna system disposed within the microsatellite body when the microsatellite is in a non-deployed state. The properties of the antenna system can be adjusted such that the antenna system does not impact, contact, or displace the imaging system when the microsatellite is in the non-deployed state. The properties of the antenna system can be adjusted such that the antenna system does not contact or impact the body of the microsatellite or any other structure when the microsatellite transitions to a deployed state. The antenna system can be configured to achieve a desired gain and/or data transmission rate by adjusting properties of the antenna system based on the radiation pattern of an antenna feed and geometric constraints imposed by the imaging system. Examples of methods for designing such imaging microsatellites are provided.

15 Claims, 6 Drawing Sheets

Related U.S. Application Data which is a continuation of application No. 13/326,175, filed on Dec. 14, 2011, now Pat. No. 8,531,524.

(60) Provisional application No. 61/423,473, filed on Dec. 15, 2010.

(51) Int. Cl.
| | | |
|---|---|---|
| *B64G 1/10* | (2006.01) | |
| *H01Q 1/08* | (2006.01) | |
| *H01Q 1/28* | (2006.01) | |
| *H01Q 19/10* | (2006.01) | |
| *B64G 1/22* | (2006.01) | |
| *B64G 1/66* | (2006.01) | |
| *H04N 7/18* | (2006.01) | |

(52) U.S. Cl.
CPC ............... *H01Q 19/10* (2013.01); *B64G 1/222* (2013.01); *B64G 1/66* (2013.01); *H04B 7/18515* (2013.01); *H04N 7/18* (2013.01)

(56) References Cited

U.S. PATENT DOCUMENTS

| | | | |
|---|---|---|---|
| 3,503,072 A | 3/1970 | Thompson | |
| 3,509,576 A | 4/1970 | McLain | |
| 3,699,581 A | 10/1972 | Hall et al. | |
| 3,729,743 A | 4/1973 | Fletcher et al. | |
| 3,783,029 A | 1/1974 | Dillard et al. | |
| 4,115,784 A | 9/1978 | Schwerdtfeger et al. | |
| 4,188,631 A | 2/1980 | Dougherty et al. | |
| 4,352,113 A | 9/1982 | Labruyere | |
| 4,371,134 A | 2/1983 | Marello et al. | |
| 4,380,013 A | 4/1983 | Slysh | |
| 4,465,951 A | 8/1984 | Dalby | |
| 4,482,900 A | 11/1984 | Bilek et al. | |
| 4,529,277 A | 7/1985 | Gee et al. | |
| 4,658,265 A | 4/1987 | Heinze et al. | |
| 4,725,025 A | 2/1988 | Binge et al. | |
| 4,780,726 A | 10/1988 | Archer et al. | |
| 4,854,526 A | 8/1989 | Rochefort | |
| 4,926,181 A | 5/1990 | Stumm | |
| 5,052,640 A | 10/1991 | Chang | |
| 5,196,857 A | 3/1993 | Chiappetta et al. | |
| 5,255,006 A | 10/1993 | Pappas et al. | |
| 5,257,034 A | 10/1993 | Turner et al. | |
| 5,350,137 A | 9/1994 | Henley | |
| 5,430,451 A | 7/1995 | Kawanishi et al. | |
| 5,527,001 A | 6/1996 | Stuart | |
| 5,557,292 A | 9/1996 | Nygren et al. | |
| 5,587,719 A | 12/1996 | Steffy | |
| 5,642,122 A | 6/1997 | Lockie et al. | |
| 5,777,582 A | 7/1998 | Raab | |
| 5,864,320 A | 1/1999 | Baghdasarian | |
| 5,909,197 A | 6/1999 | Heinemann et al. | |
| 5,927,654 A | 7/1999 | Foley et al. | |
| 5,963,182 A | 10/1999 | Bassily | |
| 5,966,104 A | 10/1999 | Massey et al. | |
| 5,977,932 A | 11/1999 | Robinson | |
| 6,016,999 A | 1/2000 | Simpson et al. | |
| 6,124,835 A | 9/2000 | Nguyen et al. | |
| 6,137,454 A | 10/2000 | Peck | |
| 6,198,461 B1 | 3/2001 | Chieusse et al. | |
| 6,202,379 B1 | 3/2001 | Meguro et al. | |
| 6,215,458 B1 | 4/2001 | Aguttes et al. | |
| 6,219,010 B1 | 4/2001 | Chieusse et al. | |
| 6,229,501 B1 | 5/2001 | Roth et al. | |
| 6,243,053 B1 | 6/2001 | Shtarkman | |
| 6,260,804 B1 | 7/2001 | Anderson et al. | |
| 6,266,030 B1 | 7/2001 | Warren et al. | |
| 6,278,416 B1 | 8/2001 | Harless | |
| 6,344,835 B1 | 2/2002 | Allen et al. | |
| 6,353,421 B1 | 3/2002 | Lalezari et al. | |
| 6,366,255 B1 | 4/2002 | Chiang | |
| 6,424,314 B1 | 7/2002 | Baghdasarian et al. | |
| 6,433,758 B2 | 8/2002 | Meguro et al. | |
| 6,448,940 B1 | 9/2002 | Chiang | |
| 6,515,636 B2 | 2/2003 | Munder et al. | |
| 6,542,132 B2 | 4/2003 | Stern | |
| 6,650,304 B2 | 11/2003 | Lee et al. | |
| 6,836,255 B1 | 12/2004 | Davis | |
| 7,009,578 B2 | 3/2006 | Nolan et al. | |
| 7,098,867 B1 | 8/2006 | Gullapalli | |
| 7,138,960 B2 | 11/2006 | Carroll et al. | |
| 7,180,470 B1 | 2/2007 | Hentosh | |
| 7,464,902 B2 | 12/2008 | Leyre et al. | |
| 7,557,995 B1 | 7/2009 | Lloyd | |
| 7,588,214 B2 | 9/2009 | Watt et al. | |
| 7,598,922 B2 | 10/2009 | Brooks et al. | |
| 7,602,349 B2 | 10/2009 | Hentosh et al. | |
| 7,686,255 B2 | 3/2010 | Harris | |
| 7,714,797 B2 | 5/2010 | Couchman et al. | |
| 7,905,453 B2 | 3/2011 | Benedict et al. | |
| 8,035,573 B2 | 10/2011 | Thompson et al. | |
| 8,089,404 B2 | 1/2012 | Nichols et al. | |
| 8,314,748 B2 | 11/2012 | Ksienski et al. | |
| 8,390,527 B2 | 3/2013 | Conrad | |
| 8,482,610 B2 | 7/2013 | do Carmo Miranda | |
| 8,487,830 B2 | 7/2013 | Texier et al. | |
| 8,531,524 B2 | 9/2013 | do Carmo Miranda | |
| 2002/0067311 A1 | 6/2002 | Wildey et al. | |
| 2002/0135532 A1 | 9/2002 | Chiang | |
| 2002/0145082 A1 | 10/2002 | Bertheux et al. | |
| 2010/0021191 A1 | 1/2010 | Yoshizuika et al. | |
| 2012/0068019 A1 | 3/2012 | Boccio et al. | |
| 2012/0146880 A1 | 6/2012 | Behrens et al. | |
| 2012/0193498 A1 | 8/2012 | Tabata et al. | |
| 2012/0235874 A1 | 9/2012 | Kwak et al. | |
| 2013/0207881 A1 | 8/2013 | Fujii et al. | |

FOREIGN PATENT DOCUMENTS

| | | |
|---|---|---|
| FR | 2 562 724 | 10/1985 |
| JP | 08-288732 | 11/1996 |
| JP | 2003-276699 | 10/2003 |
| JP | 2003-291899 A | 10/2003 |
| JP | 2009-190661 | 8/2009 |
| WO | WO 2012/082957 | 6/2012 |
| WO | WO 2013/065722 A1 | 5/2013 |

OTHER PUBLICATIONS

U.S. Appl. No. 14/132,990, filed Dec. 18, 2013, in 37 pages.
U.S. Appl. No. 14/132,963, filed Dec. 18, 2013, in 37 pages.
Carver, K.R. et al., "Microstrip Antenna Technology," reprinted from IEEE Trans. Antennas Propaga., vol. AP-29, No. 1, Jan. 1981, pp. 2-24 in "Microstrip Antennas: The analysis and design of microstrip antennas and arrays", eds. Pozar, D.M. et al., IEEE Press, New York, NY, 1995, pp. 3-25.
Cutler, C.C., "Parabolic-Antenna Design for Microwaves," Proceedings of the IRE , vol. 35, No. 11, Nov. 1947, pp. 1284-1294.
DigitalGlobe, Inc., "DigitalGlobe Core Imagery Products Guide," Feb. 2012, in 38 pages.
DoD Space Test Program, "Secondary Payload Planner's Guide for Use on the EELV Secondary Payload Adapter," Version 1.0, Jun. 8, 2001, in 30 pages.
ECC Report 115: Use of the Frequency Band 8025-8400 MHz by EESS, Ljubljana, Jan. 2008 Electronic Communications Committee (ECC) within the European Conference of Postal and Telecommunications Administrations (CEPT), in 22 pages.
Goodwin, J.S. et al., "Evolved Expendable Launch Vehicle Secondary Payload Adapter," American Institute of Aeronautics and Astronautics, Aug. 28-30, 2001, in 7 pages.
Kalman, A. et al., "MISC™—A Novel Approach to Low-Cost Imaging Satellites, 22nd Annual AIAA/USU Conference on Small Satellites, Aug. 13, 2008, in 11 pages.
Kramer, H. J., Observation of the Earth and its environment—survey of missions and sensors, Part B Commercial Imaging Satellites, Springer Verlag, 2002, 4 Ed., pp. 263-310.
Langton, C., "Intuitive Guide to Principles of Communications: Tutorial 11—Link Budgets," 2002, downloaded on Jul. 10, 2012 from http://complextoreal.com/chapters/linkbud.pdf, in 23 pages.

(56) References Cited

OTHER PUBLICATIONS

Lo, A.S. et al., "Secondary Payloads Using the LCROSS Architecture," American Institute of Aeronautics and Astronautics, Sep. 24, 2007, pp. 1-8.
Love, A.W., "Some highlights in reflector antenna development," Radio Science, vol. 11, Aug.-Sep. 1976, pp. 671-684.
"Miniaturized satellite" from Wikipedia, the free encyclopedia, downloaded Mar. 30, 2012 from http://en.wikipedia.org/wiki/Miniaturized_satellite, in 4 pages.
Pozar, D.M., "Microstrip antennas", IEEE Proc., vol. 80, Jan. 1992, pp. 79-91.
Sandau, R., "Potential and Shortcomings of Small Satellite for Topographic Mapping", Proceedings, ISPRS Comm. I WG 6 Workshop 2006, Feb. 14-16, 2006, Ankara, Turkey, pp. 1-7.
Schaubert, D.H., "A Review of Some Microstrip Antenna Characteristics," in "Microstrip Antennas: The analysis and design of microstrip antennas and arrays," eds. Pozar, D.M. et al., IEEE Press, New York, NY, 1995, pp. 59-67.
Various Authors, "Chapter 4: Techniques for Improving Element Bandwidth," in "Microstrip Antennas: The analysis and design of microstrip antennas and arrays," eds. Pozar, D.M. et al., IEEE Press, New York, NY, 1995, pp. 155-201.
Preliminary Amendment in U.S. Patent Publication No. 2012/0154585, filed Nov. 13, 2012, in 8 pages.
U.S. Appl. No. 13/566,548, filed Aug. 3, 2012, in 37 pages.
Preliminary Amendment in U.S. Appl. No. 13/566,548, filed Nov. 13, 2012, in 5 pages.
Notice of Allowance for U.S. Appl. No. 13/566,548, dated Apr. 15, 2013, in 18 pages.
International Search Report and Written Opinion for International Application No. PCT/US2011/064998, filed Dec. 14, 2011, mailing date Apr. 10, 2012, in 11 pages.
International Preliminary Report on Patentability for International Application No. PCT/US2011/064998, filed Dec. 14, 2011, mailed Jun. 18, 2013, in 6 pages.
Klofas, Bryan, "CubeSat Communications Survey Update", 2011 Summer Developer's Workshop, Utah State University, Aug. 2011, in 14 pages.
Kofas, Bryan et al., "A Survey of CubeSat Communications Systems", The AMSAT Journal, Nov./Dec. 2009, pp. 23, 25-30.
Planet Labs Inc., "Welcome to Your Planet", downloaded from www.planet-labs.com on Dec. 13, 2013, in 7 pages.
Planet Labs Inc., image of the Dove 2 spacecraft, 2013.
Planet Labs Inc., image of Dove spacecraft prototypes, 2013.
Planet Labs Inc., image of UHF antenna on the Dove 2 spacecraft, 2013.
Planet Labs Inc., image of fleet, 2013.
Planet Labs Inc., press kit, Nov. 2013, in 15 pages.
Cosmogia, Inc., "Cosmogia Dove-1 Orbital Debris Assessment Report (ODAR)," Report Version: 1.3, Jan. 6, 2012, in 18 pages.
Cosmogia, Inc., "Dove-2 Orbital Debris Assessment Report (ODAR)," Report Version: 1.1, Feb. 23, 2011, in 20 pages.
Cosmogia, Inc., "Dove 3 Orbital Debris Assessment Report (ODAR)," Report Version: 2, Oct. 9, 2012, in 21 pages.
Marshall, W., "Planet Labs' Remote Sensing Satellite System," Small Satellite Constellations 2013 Cubesat Summer Workshop, Pre-Conference Workshop Technical Submissions, Aug. 10-15, 2013, in 31 pages.
CubeSat Design Specification, The CubeSat Program, California Polytechnic State University SLO, Rev. 12, Aug. 2009, in 22 pages.
Planet Labs Inc., "Description of Research Project," 2013, in 1 page.

INTEGRATED ANTENNA SYSTEM FOR IMAGING MICROSATELLITES

CROSS-REFERENCE TO RELATED APPLICATIONS

This application is a continuation of U.S. patent application Ser. No. 13/326,175, filed Dec. 14, 2011, entitled "INTEGRATED ANTENNA SYSTEM FOR IMAGING MICROSATELLITES," now U.S. Pat. No. 8,531,524, which claims the benefit of priority under 35 U.S.C. §119(e) of U.S. Provisional Patent Application 61/423,473, filed Dec. 15, 2010, entitled "INTEGRATED REFLECTOR ANTENNA AND OPTICAL SEAL FOR MICRO IMAGING SATELLITES." This application is also a continuation of U.S. patent application Ser. No. 13/566,548, filed Aug. 3, 2012, entitled "INTEGRATED ANTENNA SYSTEM FOR IMAGING MICROSATELLITES," now U.S. Pat. No. 8,482,610, which is a continuation of International Application No. PCT/US2011/064998, designating the United States, with an international filing date of Dec. 14, 2011, titled "INTEGRATED ANTENNA SYSTEM FOR IMAGING MICROSATELLITES," which claims the benefit under 35 U.S.C. §119(e) of U.S. Provisional Patent Application No. 61/423,473, filed Dec. 15, 2010, titled "INTEGRATED REFLECTOR ANTENNA AND OPTICAL SEAL FOR MICRO IMAGING SATELLITES." Each of the foregoing patent applications is hereby incorporated by reference herein in its entirety for all each application discloses, and each application is made a part of this specification as if set forth fully herein.

BACKGROUND

1. Field

The disclosure generally relates to microsatellites, and more particularly, to antenna systems and imaging systems for microsatellites.

2. Description of the Related Art

Microsatellites are satellites that are smaller than traditional satellites. Due to their smaller size, microsatellites generally cost less to build and deploy into orbit above the Earth. As a result, microsatellites present opportunities for educational institutions, governments, and commercial entities to launch and deploy microsatellites for a variety of purposes with fewer costs compared to traditional, large satellites. Microsatellites have been deployed for purposes such as data collection for scientific experiments, providing communication links, and imaging the Earth.

SUMMARY

The systems, methods and devices of the disclosure each have several innovative aspects, no single one of which is solely responsible for the desirable attributes disclosed herein. Without limiting the scope of the claims, some of the advantageous features will now be summarized.

Certain challenges are presented when designing microsatellites such as incorporating the desired structure and electronics into a relatively small form factor, maximizing the efficiency of the included components given volume and mass constraints, and providing sufficient communication systems to relay information to and from ground-based systems. Imaging microsatellites, for example, utilize much of the volume of the satellite for the imaging system, reducing the available space for other components, such as antennas for communication. In addition, imaging microsatellites can produce relatively large amounts of information making it desirable to incorporate a communication system capable of a relatively high data transmission rate, consequently making larger antenna systems more desirable.

Microsatellites can be advantageous where satellite capabilities are desirable but the cost to manufacture and launch a traditional, large satellite renders the possibility impracticable or unworkable. Microsatellites are smaller and weigh less than traditional, large satellites and therefore are generally cheaper to manufacture and put into orbit. However, challenges arise when reducing the size of components and systems to fit into a microsatellite. For instance, large satellites may include large communications antennas making high data transmission rates possible. Microsatellites, on the other hand, are limited in the size of antenna that may be included, possibly reducing the data transmission rate available. The gain of the antenna may also be affected by the size of the antenna, affecting the link margin and size of ground communication systems. The gain of the antenna may also be affected by the frequency band of communication with the ground or other satellites. Imaging microsatellites also incorporate imaging systems, reducing the space available for antenna systems. Certain antenna systems may satisfy space and weight concerns yet create additional costs and introduce undesirable complexity into the system. In imaging microsatellites, the imaging system generally has a desired configuration which limits the configuration of other systems and components within the satellite. For example, it may be desirable that the imaging system have a field of view unobstructed by other components when the satellite is deployed. The antenna configuration, then, can be advantageously configured to fit within the body of the microsatellite without disturbing the imaging system configuration. In some embodiments, an imaging microsatellite can be configured to house both an antenna system and an imaging system, communicate with a data rate sufficient to transmit image and video data to a ground-based communication system, reduce system complexity, reduce manufacture costs, optimize the antenna system given the size and/or mass constraints, and/or increase the packing efficiency of both antenna and imaging system.

Some embodiments provide an imaging microsatellite having an antenna system and an imaging system. The microsatellite can include a body a plurality of surfaces forming an interior cavity and an opening in the body. The imaging system can be disposed within the interior cavity of the microsatellite and configured to image a field of view through the opening in the microsatellite body. The microsatellite can include a door and the antenna system can be coupled to the door.

The antenna system can include an antenna reflector coupled to the door, an antenna feed support attached to the antenna reflector or the door, and an antenna feed attached to the antenna feed support. The antenna feed support can be configured to secure the antenna feed in a fixed position relative to the antenna reflector.

The door can be movable from a closed position to an open position, wherein in the closed position the door covers the opening and in the open position the door uncovers the opening. The antenna system can be configured to fit within the interior cavity without coming into contact with the imaging system when the door is in a closed position. The antenna system can be configured to move with the door through the opening in an unobstructed manner when the door moves from the closed position to the open position.

In some embodiments, the microsatellite can have a volume that is less than or equal to about 125 cm by 125 cm by 175 cm or a mass that is less than or equal to about 500 kg. The microsatellite can be configured to launch as a secondary payload on a launch vehicle configured to launch a primary payload.

In some embodiments, the antenna reflector of the microsatellite can have a diameter that is less than or equal to about 120 cm or greater than or equal to about 30 cm. The antenna reflector can have a diameter that is greater than or equal to 50% of the width of the door or less than or equal to 98% of the width of the door. The antenna system can be configured to provide a gain greater than or equal to 25 dBi (e.g., dB isotropic, which measures antenna gain compared to a hypothetical isotropic antenna) or a data transmission rate between about 1 Mbit/s to 100 Mbit/s.

The imaging system can include a telescope. The imaging system telescope can include a primary mirror, a secondary mirror, and a secondary mirror support configured to secure the secondary mirror in a fixed position relative to the primary mirror. For example, the imaging system telescope may be a Cassegrain telescope or a Ritchey-Chrétien telescope. The antenna feed can be disposed between the primary mirror and the secondary mirror when the door is in the closed position. The imaging system can include a primary baffle associated with the primary mirror and a secondary baffle associated with the secondary mirror. The antenna feed can be disposed between the primary baffle and the secondary baffle when the door is in the closed position.

Some embodiments provide for a method of designing an imaging microsatellite. The imaging microsatellite can include an interior cavity and an opening. The microsatellite can include a door configured to cover the opening when the microsatellite is in a non-deployed state and to uncover the opening when the microsatellite is in a deployed state. The microsatellite can include an antenna system attached to the door. The antenna system can include a reflector and an antenna feed. The microsatellite can include an imaging system disposed within the interior cavity and configured to image a field of view through the opening when the microsatellite is in the deployed state.

The method of designing the imaging microsatellite includes obtaining configuration parameters for the microsatellite. The microsatellite configuration parameters can include dimensions of the microsatellite.

The method can include obtaining configuration parameters for the imaging system. The imaging system configuration parameters can include dimensions and layout of the imaging system within the interior cavity of the microsatellite.

The method can include determining a layout of the antenna system such that (1) the antenna system does not contact or displace portions of the imaging system when the microsatellite is in the non-deployed state, and (2) the antenna system does not contact portions of the microsatellite when the microsatellite transitions from the non-deployed to the deployed state.

The method can include adjusting properties of the antenna system such that the reflector matches a radiation pattern of the antenna feed and a desired antenna gain or data transmission rate is achieved.

In some embodiments, adjusting the properties of the antenna system can include adjusting at least one of a diameter, a depth, or a focal length of the reflector. The steps of determining and adjusting can be repeated until a ratio of the focal length to the diameter is in a desired range. In various implementations, the desired data transmission rate can be greater than or equal to about 1 Mbit/s, greater than or equal to about 10 Mbit/s, greater than or equal to about 50 Mbit/s, greater than or equal to about 75 Mbit/s, or greater than or equal to about 100 Mbit/s. In various implementations, the desired data transmission rate can be in a range between about 1 Mbit/s and 100 Mbit/s, in a range between about 10 Mbit/s and 80 Mbit/s, or in some other range. In various implementations, the desired antenna gain can be greater than or equal to about 15 dBi, greater than or equal to about 20 dBi, greater than or equal to about 25 dBi, or greater than or equal to about 30 dBi. In various implementations, the desired antenna gain can be in a range between about 10 dBi and 30 dBi, between about 15 dBi and 25 dBi, between about 20 dBi and 30 dBi, between about 25 dBi and 30 dBi, between about 28 dBi and 29 dBi, or some other range.

Some embodiments provide for an imaging microsatellite that can include a body that can have a volume envelope less than about 125 cm by 125 cm by 175 cm or a mass envelope less than about 500 kg. The body can have an interior cavity and an opening in the body. The microsatellite can include an imaging system disposed within the interior cavity. The imaging system can include a primary mirror and a secondary mirror. The microsatellite can include a door attached to the body. The microsatellite can have a non-deployed state in which the opening is covered by the door, and a deployed state in which the opening is unobstructed by the door and the imaging system can image a field of view through the opening. The microsatellite can include an antenna system. The antenna system can have a reflector and a feed, and the antenna system can be coupled to the door. When the microsatellite is in the non-deployed state, the feed can be disposed between the primary mirror and the secondary mirror. The antenna system can be configured to move through the opening without contacting portions of the imaging system or portions of the body of the microsatellite when the microsatellite transitions from the non-deployed state to the deployed state.

In some embodiments, the imaging system can include a primary baffle associated with the primary mirror and a secondary baffle associated with the secondary mirror. The antenna feed can be disposed between the primary baffle and the secondary baffle when the microsatellite is in the non-deployed state. The primary mirror and the secondary mirror can be spaced apart by two or more support struts. The feed can be disposed near a focus of the reflector by a feed support, and the feed support can extend between two adjacent struts when the microsatellite is in the non-deployed state.

In some embodiments, the antenna reflector can have a diameter d and focal length f. The antenna reflector focal length, f, and diameter, d, can be adjusted to obtain a ratio f/d that matches a radiation pattern of the feed.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Figure 1:
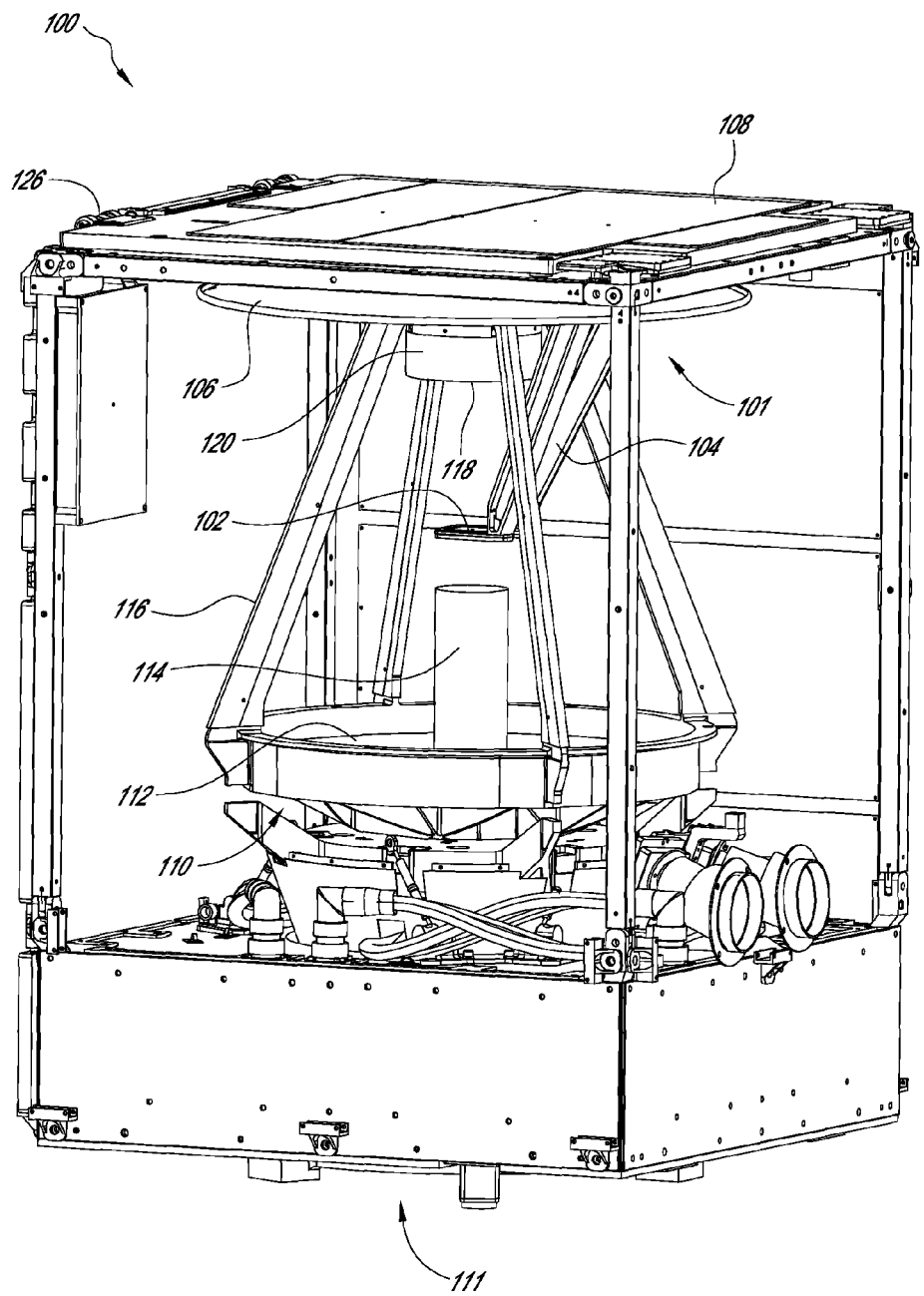
FIG. 1 is a plan view of an example of an imaging system and antenna system within a satellite body according to some embodiments of an imaging microsatellite.

Unless explicitly indicated otherwise, terms as used herein will be understood to imply their customary and ordinary meaning. For example, microsatellite is a broad term and is to be given its ordinary and customary meaning to a person of ordinary skill in the art (e.g., it is not to be limited to a special or customized meaning), and includes, without limitation, satellites with a mass less than or equal to about 500 kg and/or physical dimensions less than or equal to about 125 cm×125 cm×175 cm, or satellites that launch as a secondary payload on a launch vehicle. According to some conventions, satellites having a mass less than or equal to about 500 kg are classified as small satellites with further divisions being made based on their mass. For example, in one classification system, small satellites are deemed minisatellites when they have a mass between about 100 kg and 500 kg, microsatellites when they have a mass between about 10 kg and 100 kg, nanosatellites when they have a mass between about 1 kg and 10 kg, picosatellites when they have a mass between about 0.1 kg and 1 kg, and femtosatellites when they have a mass less than or equal to about 100 g. However, any reference to microsatellite, minisatellite, or small satellite in this disclosure should be understood to mean the general class of satellites having a mass less than or equal to about 500 kg and/or physical dimensions less than or equal to about 125 cm×125 cm×175 cm; and not to the more specific classification of satellites identified herein or other similar classification schemes.

Some microsatellites may conform to ESPA standards. ESPA stands for EELV Secondary Payload Adapter, and EELV stands for Evolved Expendable Launch Vehicle, which include, for example, Atlas V and Delta IV launch vehicles. ESPA specifications have been adopted by many in the microsatellite industry as a guideline for determining acceptable microsatellite mass and/or volume for inclusion in launch vehicles. ESPA standards recite a mass envelope of less than or equal to about 180 kg and a volume envelope less than 90 cm×70 cm×60 cm. A microsatellite conforming to these specifications would be suitable for inclusion in a launch vehicle employing an EELV secondary payload adapter. The ESPA standard provides non-limiting examples of envelopes for what constitutes a microsatellite; however, microsatellites configured according to other standards may be suitable for other launch vehicles.

Explanations of other terms used in the following detailed description are provided in a separate section below.

General Overview

Microsatellites are limited in size due in part to launch vehicle constraints, which consequently reduces the available size of the components included thereon. The limited size of the antenna system generally reduces the available gain of the satellite antenna. The gain of the satellite antenna can be related to the communication frequency, with the gain generally increasing with frequency. However, satellites may be confined within an allocated range of communication frequencies. For example, in 47 C.F.R. §2.106 the Federal Communications Commission (FCC) has allocated a band of frequencies between about 8.0 GHz and 8.4 GHz for imaging satellite communications. Thus, the communication frequency may only be altered within a relatively narrow band, limiting the ability to increase the antenna gain by increasing the communication frequency. The gain of the satellite antenna can be related to the available RF link margin which drives the data transmission rate. Increasing the gain by increasing the antenna size, power to the antenna, communication frequency, or any combination of these can increase the data transmission rate. It would be advantageous, then, for a microsatellite system to increase the gain of the antenna system, and relatedly the data transmission rate, while maintaining the size within a desired envelope and the communication frequency within an allocated band. Larger satellites generally do not encounter this problem because the larger size and mass limitations allow for larger antennas with sufficient gains and link margins to achieve relatively high data transmission rates, even when confined to a band of communication frequencies. For example, large satellites often make use of large aperture reflector antennas to transmit data. These same solutions generally are not available for microsatellites due to the size and mass constraints imposed.

To increase the utility of microsatellites, therefore, it would be advantageous to incorporate a relatively high gain antenna into a small form factor or envelope of the microsatellite. One such possible solution may be to incorporate patch antenna arrays to increase the gain of the satellite antenna. However, as the gain requirement increases, the cost and complexity of manufacturing a patch array that meets the gain requirement outpaces the cost and complexity of the remainder of the microsatellite. Therefore, it would be advantageous to provide a relatively low-cost and relatively straight-forward antenna system that satisfies the gain requirements of the microsatellite system. Microsatellites according to the embodiments described herein advantageously allow for the incorporation of a relatively large antenna reflector while maintaining the imaging system footprint within the microsatellite, increasing the available gain, link margin, and data transmission rate of the antenna system.

Example System Overview

Some embodiments provide an imaging microsatellite that includes an integrated reflector antenna system and an imaging system. The integrated reflector antenna system and imaging system can be configured to fit within the body of the microsatellite when it is not deployed. The characteristics of the antenna system can be tuned to increase the gain of the antenna, and thereby increase the possible data transmission rate, while still being configured to be disposed within the microsatellite body along with the imaging system. In some implementations, the antenna system may be fully enclosed within the microsatellite prior to deployment of the antenna system.

In some embodiments the integrated reflector antenna system comprises a paraboloid reflector surface having an antenna feed support substantially securing an antenna feed at the focal point of the reflector. The diameter and focal length of the antenna may be tuned to improve or optimize the antenna gain and transmission rate. The ranges through which the diameter and focal length may be tuned can be limited by the available space in the body of the microsatellite, the imaging system configuration, the method of deployment of the microsatellite, the envelope of the secondary payload, or any combination of these.

The imaging microsatellite can include an optical seal and a door attached to the body of the microsatellite. The door can comprise an opening mechanism configured to attach the door to a surface of the microsatellite and to provide an axis of rotation and/or an opening torque. The imaging microsatellite can include an opening configured to allow radiation to enter the imaging system. The door can be configured to cover the opening when in a closed state. The imaging microsatellite can include an optical seal configured to be substantially in contact with the door when in a closed state and configured to substantially prevent contaminating particulates from passing through the opening. For example, in some embodiments the optical seal comprises a pliable member disposed along the periphery of an opening, the optical seal being configured to substantially seal the opening from the introduction of contaminants. The sealing occurs due to the contact between the optical seal and the door when it is in a closed state. In some embodiments, the antenna reflector can be attached to an interior surface of the door such that when the door is in a closed state the antenna reflector can be disposed within the satellite body. For example, a paraboloid reflector antenna having an antenna feed support and antenna feed can be attached to the interior side of a hinged door and can be configured to pass through an opening in the microsatellite body when the door transitions from an open to a closed state.

The imaging system of the microsatellite can include optical elements, support structure, electrical systems, image sensors, radiation filters, baffles, or any combination of these. In some embodiments, the imaging system comprises a primary mirror and a secondary mirror configured to produce an image on an image sensor disposed behind the primary mirror. A secondary mirror support structure can secure the secondary mirror at a substantially fixed position relative to the primary mirror. In some embodiments, the antenna feed is disposed between the primary and secondary mirrors and does not contact, impact, or displace the secondary mirror support when the door is in a closed state.

FIG. 1 is a plan view of an example of an imaging system and antenna system within a satellite body according to some embodiments of an imaging microsatellite. In FIG. 1, an example of an imaging microsatellite 100 in a non-deployed state is shown. Three side panels of the microsatellite 100 have been removed from this illustration to show the configuration of certain components in the interior cavity of the microsatellite when it is in a non-deployed state. In some implementations, the microsatellite 100 is a secondary payload on a launch vehicle designed to launch a primary payload (e.g., a large satellite). The microsatellite 100 can include an interface 111 adapted to engage a structure (e.g., an ESPA secondary payload adaptor) that can be connected to the primary payload, so that the microsatellite 100 can be transported as a ride-along on the launch vehicle.

The imaging microsatellite 100 can comprise an antenna system 101. The antenna system 101 can comprise an antenna feed 102 connected to an antenna feed support 104. The antenna feed support 104 can be attached to an antenna reflector 106 or to an interior side of a door 108. The door 108 can be attached to the microsatellite 100 with hinges 126.

The imaging microsatellite 100 can comprise an imaging system 110. The imaging system 110 can comprise a primary mirror 112 and a first baffle 114 configured to limit the amount of stray photons incident on an imaging sensor (not shown). The imaging system 110 can comprise a secondary mirror support 116 configured to secure a secondary mirror 118 in a fixed position relative to the primary mirror 112. The imaging system 110 can comprise a second baffle 120 attached to or surrounding the secondary mirror 118 or the secondary mirror support 116. The second baffle 120 can be configured to substantially reduce the amount of stray radiation incident on the secondary mirror 118 that may otherwise end up impinging on the image sensor in the absence of the second baffle 120.

The imaging system 110 of the microsatellite 110 can comprise a Cassegrain telescope. The primary mirror 112 can be a paraboloid and the secondary mirror 118 can be a hyperboloid. The imaging system can comprise additional optical elements, such as, for example, lenses, diffraction gratings, mirrors, prisms, fiber optics, light guides, or any combination of these. The primary and secondary mirrors 112 and 118 can be disposed such that their vertices and focal points are disposed substantially along a line. In some embodiments, the orientation of the mirrors can be such that their focal points and vertices do not substantially fall along a single line. In some embodiments, the imaging system 110 can comprise a Ritchey-Chrétien telescope wherein the primary and secondary mirrors 112 and 118 can be hyperboloids.

The antenna system 101 of the microsatellite 100 can be attached to an interior side of the door 108 such that when the door is in a closed state, the antenna system can be disposed within the interior of the microsatellite 100. When the door 108 is in a closed state, the antenna system 101 can be configured to not contact, impact, or displace the imaging system 110. The antenna feed 102 can be configured to be positioned in a region between the first and second baffles 114 and 120 when the microsatellite is in the non-deployed state. The antenna feed support 104 can be configured to be disposed between elements of the secondary mirror support 116 so as to not contact, impact, or displace it when the door 108 is in a closed state. The antenna system 101 can be configured to improve or optimize the size, gain, and/or transmission rate by changing the diameter, focal length, and/or depth of the antenna reflector 106 provided that the antenna reflector 106, the antenna feed support 104, and the antenna feed 102 do not contact, impact, or displace the imaging system 110 when the microsatellite 100 is not deployed.

The secondary mirror support 116 can comprise one or more support elements configured to support the secondary mirror 118 relative to the primary mirror 112. For example, in some embodiments the secondary mirror support 116 comprises four support members extending from the primary mirror 112 to the secondary mirror as shown in FIG. 1. The four support members can be substantially equidistant from one another, or may be non-uniformly spaced. The antenna feed support 104 can be configured to be disposed between the support members of the secondary mirror support 116 when the microsatellite is in a non-deployed state. In some embodiments, the secondary mirror support 116 comprises one or more support members configured to allow the antenna feed support 104 to be positioned in such a fashion that it does not contact, impact, or displace the imaging system 110 or the support elements of the secondary mirror support 116 when the door 108 is closed.

The antenna feed 102 can be positioned between the first and second baffles 114 and 120 when the door 108 is in a closed state. In some embodiments, the antenna feed 102 can be disposed such that it intersects a line passing substantially through the centers of the first and second baffles 114 and 120. In some embodiments, the antenna feed 102 can be disposed in such a manner as to not intersect this line. In some embodiments, the antenna feed can be disposed such that it intersects a line passing substantially through the vertices of the primary and secondary mirrors 112 and 118. In some embodiments, the antenna feed 102 can be disposed in such a manner as to not intersect this line.

The microsatellite 100 can comprise a body with multiple sides or faces. On at least one side, the microsatellite 100 can comprise a panel, dome, cap, or the like which can function as the door 108. The hinges 126 can comprise any suitable type of hinge such as, for example, spring hinges, space hinges, or the like. The door 108 can be configured to substantially cover an entire side or face of the microsatellite body. The door 108 can comprise a substantially planar rigid structure, a dome, a pyramid, or any other suitable configuration providing a surface to attach the antenna reflector 106. The door 108 can be substantially secured in a closed state utilizing a release mechanism 130. The release mechanism 130 can utilize any appropriate method for securing the door 108 in a closed state, including, for example, mechanical latch and spring systems, inductive systems, magnetic latch and switch systems, electromagnetic systems, or any combination of these. In some satellite systems, the release mechanism 130 uses a frangible bolt and can be released by fracturing or melting the bolt.

Solar panels can be disposed on one or more sides or faces of the microsatellite 100 and can provide power to electrical components in the microsatellite. Electrical components and systems can be included in the body of the microsatellite 100 and can be configured to control and communicate with any system of the microsatellite 100 and/or analyze and record any data from those systems. In some embodiments, a data collection system can be connected to the antenna feed 102. Data collected from the data feed can be routed to electronic systems disposed within the microsatellite interior cavity. For example, the data can be routed via a wire or optical fiber from the antenna feed 102 down the antenna feed support 104 and into the door 108 and then routed through a hinge 126. The data can be routed through a wire that extends from the antenna feed 102 to the interior face of the door 108 and through the opening in the microsatellite.

Example of a Deployed Imaging Microsatellite

Figure 2:
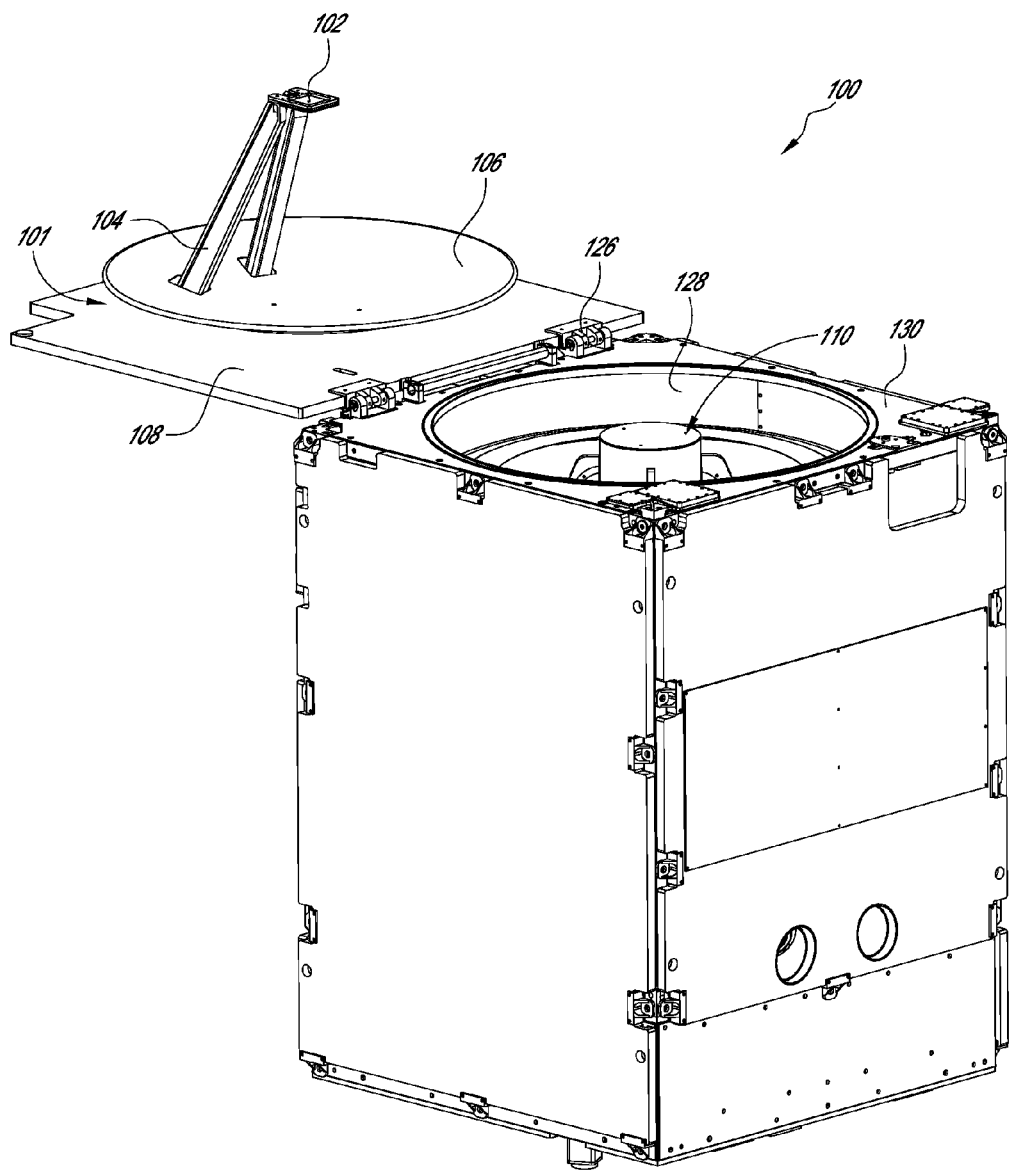
FIG. 2 is a plan view of an embodiment of an imaging microsatellite after an antenna system has been deployed.

FIG. 2 is a plan view of an embodiment of the imaging microsatellite 100 after the antenna system 101 has been deployed. The antenna system 101 can be attached to the door 108 of the microsatellite 100 such that the antenna system 101 exits the interior cavity of the microsatellite 100 when the door 108 opens. The antenna system 101 can be attached to the door 108 using any suitable means including, for example, fasteners, adhesives, clamps, clips, friction fitting, or any combination of these.

A proximal end of the antenna feed support 104 (e.g., the end nearest the reflector 106) can be integrally formed with or attached to the antenna reflector 106 or the door 108 using any suitable means such as fasteners, adhesives, clamps, clips, friction fitting, or the like. As shown in FIG. 2, the antenna feed support 104 can pass through the antenna reflector 106 and can be attached to the door 108. The antenna feed 102 can be disposed on a distal end of the antenna support 104 (e.g., the end farthest from the reflector 106) and can be integrally formed with the antenna feed support 104 or attached to the distal end using, for example, fasteners, adhesives, clamps, clips, friction fitting, or any combination of these. The antenna feed 102 can comprise a rigid member to support an active feed element. The antenna feed 102 can comprise a feed horn, a dipole driven element, a waveguide, an ortho-mode transducer, a polarizer, and/or any combination of these. The antenna reflector 106 can comprise a reflector surface having a vertex, diameter, and focal length. The antenna feed 102 can be disposed substantially at the focal point of the antenna reflector 106.

The imaging microsatellite 100 can include an opening configured to allow radiation to enter the imaging system 110. The opening can be configured to be of a sufficient size such that the antenna system 101 can pass through the opening upon the door 108 opening or closing. The opening can include an optical seal 128 along a perimeter of the opening. The optical seal 128 can be configured to create a seal with the door 108 when the microsatellite is in the non-deployed state, such that contaminants are substantially unable to enter into the interior cavity of the microsatellite 100. When the door 108 is in a closed state, the door 108 and the optical seal 128 can be substantially in contact with one another such that a seal can be created.

The dimensions of the antenna reflector 108 can be configured to substantially occupy the available space on the door 108 of the microsatellite 100. The aperture of the reflector antenna system 101 can be related to the gain of the system and the data transmission rate. Therefore, it is desirable to substantially increase or maximize the aperture of the antenna reflector 106 given the size constraints of the envelope, the size of the opening, and the dimensions of the door 108. In some embodiments, the antenna reflector 108 can be a paraboloid having a substantially circular cross-section. The aperture of the antenna reflector 108 in this configuration scales with the square of the diameter. The diameter of the antenna reflector 106 can be less than or equal to about 120 cm, greater than or equal to about 30 cm, and/or between about 40 cm and 50 cm. The diameter of the antenna reflector 106 can be related to the shorter of the length or width shortest dimension of the door 108 and can be less than or equal to about 98% of that size, greater than or equal to about 50% of that size, between about 75% to 98% of that size, between about 80% to 95% of that size, and/or between about 90% to 95% of that size.

Example of an Imaging Microsatellite in a Non-Deployed State

Figure 3:
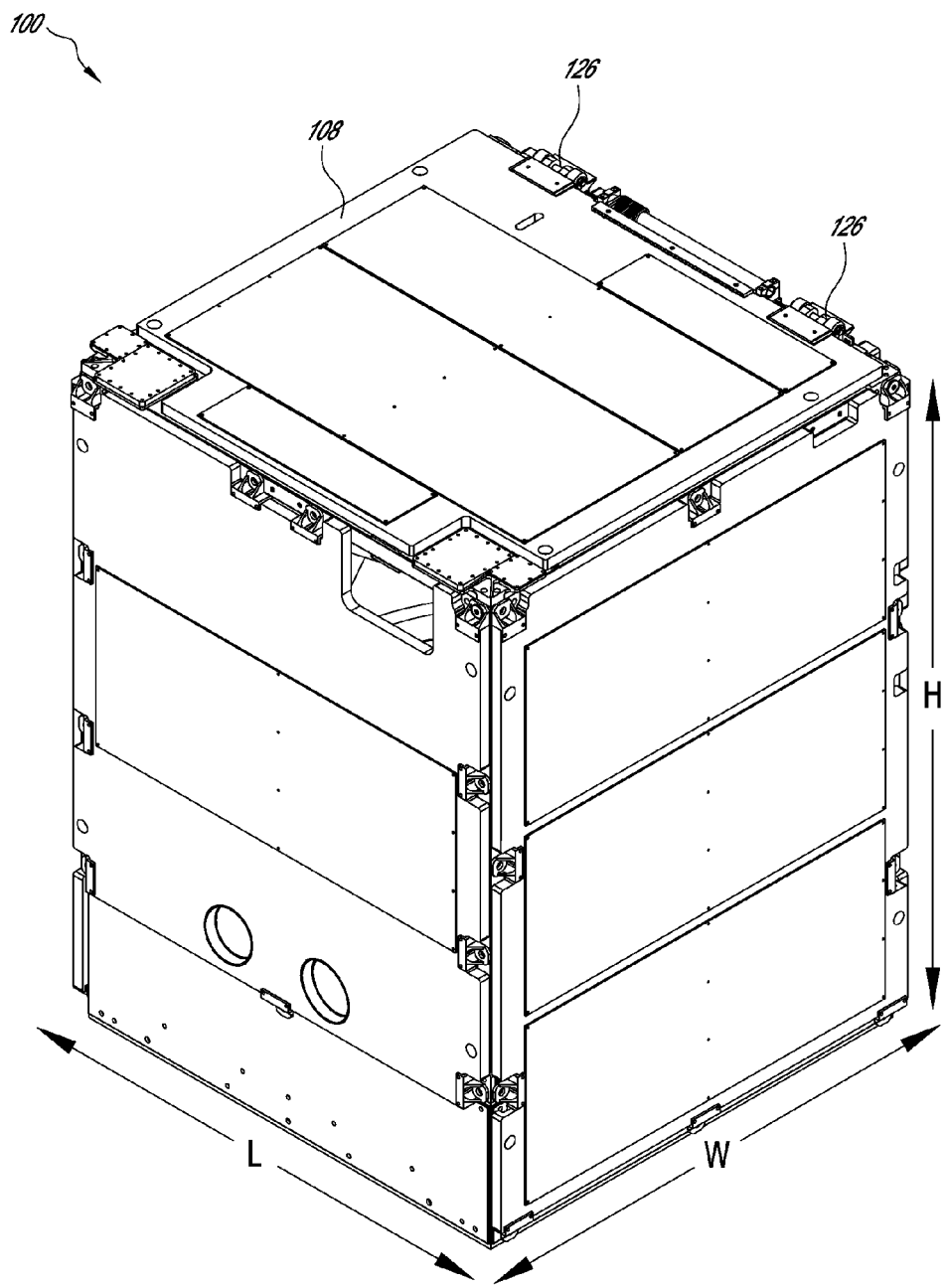
FIG. 3 is a plan view of an embodiment of an imaging microsatellite before an antenna system has been deployed.

FIG. 3 is a plan view of an embodiment of the imaging microsatellite 100 before the antenna system has been deployed. The door 108 can be configured to substantially be in contact with the optical seal 128 (see, e.g., FIG. 2) and a surface of the microsatellite 100 when in a closed state. The optical seal can be configured to be in contact with the door 108. When the door 108 is in the closed state, the release mechanism 130 can apply a torque or force on the door 108 to prevent the hinges 126 from opening the door 108. In the closed state, there can be a substantial seal between the door 108 and the optical seal 128 to prevent entry of contaminants into the interior of the microsatellite 100, which beneficially may decrease the likelihood of contamination or damage to the imaging system or antenna system. When the microsatellite is in a suitable orbit and attitude, the door 108 can be opened to deploy the antenna system 101 and to permit the imaging system 110 to image targets on the Earth. In order to open the door 108, the release mechanism 130 can be released, and the one or more hinges 126 can apply a torque or force on the door 108 to rotate the door 108 into the deployed state shown in FIG. 2.

As shown in FIG. 3, the microsatellite 100 can have a length L, a width W, and a height H. In some implementations, each of L, W, and H is less than about 175 cm. As discussed herein, the size of the microsatellite (e.g., L, W, and H) can be selected so that the microsatellite is adapted to be a secondary payload on a launch vehicle. For example, the size (and/or mass) of the microsatellite can be selected to conform to ESPA guidelines.

The example microsatellite 100 illustrated in FIGS. 1-3 has six sides but in other implementations, the microsatellite may comprise any suitable number of sides or faces and may be in any appropriate configuration, such as, for example, a cube, sphere, octagonal prism, or any polyhedron, or any three-dimensional structure with any number of planar and/or curved faces.

Examples of Factors for Improving or Optimizing the Antenna Design

Figure 4:
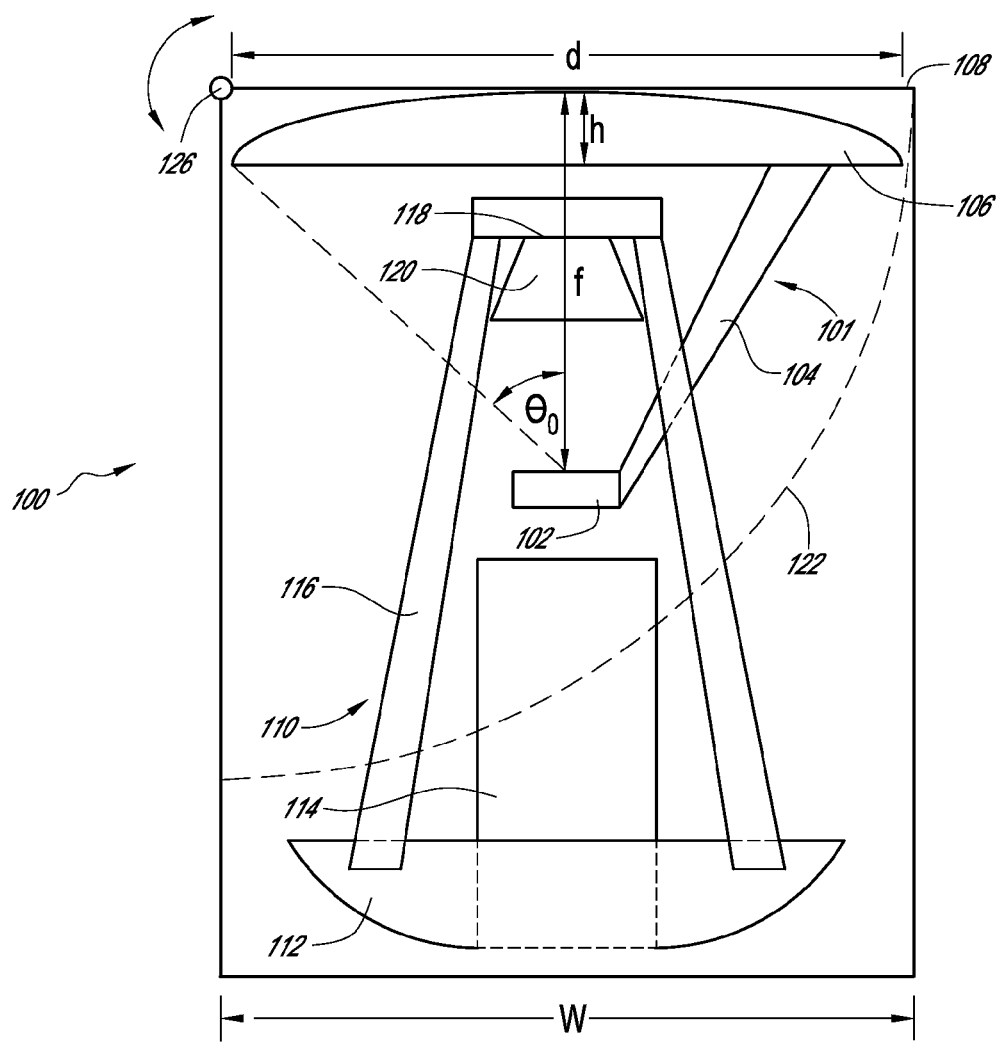
FIG. 4 is a schematic cross-section view that illustrates examples of some design considerations when combining an imaging system and antenna system within a microsatellite.

FIG. 4 is a schematic cross-section view that illustrates examples of some design considerations when combining an imaging system 110 and antenna system 101 within a microsatellite 100. FIG. 4 shows examples of various factors that can affect the gain and/or data transmission rate of the antenna system 101. In some implementations, the antenna reflector 106 can have a diameter, d, a focal length, f, and a depth, h. In FIG. 4, the door 108 opens by rotating around an axis through the hinges 126. As will be further discussed below, if structures attached to the door 108 extend too far away from the door 108, the structures may impact or hit sides or other portions of the microsatellite when the door 108 opens. Therefore, FIG. 4 shows a dashed circular reference line 122 that represents the distance from the hinges 126 that is equal to the width W of the door 108.

The antenna feed 102 can be optimally located approximately at the focal point of the reflector 106. The focal length, f, of the reflector 106 may be constrained or limited to certain ranges or values, so that the door 108 can open without the antenna feed 102 (or other structures) impacting or hitting portions of the microsatellite. Also, the antenna feed 102 can advantageously be disposed such that it does not contact, impact, or displace the first or second baffles 114, 120 or the primary or secondary mirrors 112, 118, if the first or second baffles 114, 120 are not used. The height of the first light baffle 114 can be adjusted to prevent more or less radiation to impinge on the image sensor. Reducing the size of the light baffle 114 can create more space for the antenna feed 102, but the level of stray radiation on the image sensor may increase accordingly. Therefore, it can be desirable to achieve a balance between decreasing the length of or eliminating the first light baffle 114 and increasing the desired focal length, f, of the antenna reflector 106. Similarly, the second light baffle 120 can be eliminated or altered depending on the desired focal length, f, of the antenna reflector 106 and the desired level of stray light baffling.

In some implementations, for the door 108 to open or close without obstruction, the positions of the antenna feed 102 and the antenna feed support 104 may be constrained or limited by the reference line 122. For example, any structure attached to the door 108 that extends beyond the reference line 122 may contact the side (or other portion) of the microsatellite 100 and/or may come into contact with the opening in the microsatellite 100 as the door 108 opened or closed. Thus, in certain implementations, the focal length, f, of the antenna reflector may be selected such that no obstruction occurs.

The reflector 106 can have a diameter, d, that allows the door 108 to open or close in an unobstructed manner. The diameter, d, can be approximately equal to the length of the door 108 or substantially equal to the diameter of the opening in the microsatellite 100. It also may be desirable that the curvature of the reflector 106 not be sufficiently large that the antenna reflector 106 extends beyond the reference line 122, for substantially the same reasons why the antenna feed 102 should not extend beyond the reference line 122.

The gain of a reflector antenna system is generally proportional to the aperture of the antenna reflector 106. It may be desirable to increase the diameter, d, of the antenna reflector 106 to be substantially the same length as the door 108 or opening in the microsatellite 100 so that a high gain is achieved. For some reflectors, the focal length, f, is related to the diameter, d, and depth, h, through the equation: $f = d^2/16h$. For some such reflectors, the focal ratio, f/d, can be related to $\theta_0$, the opening angle from the focal point to the edge of the reflector 106, through the equation: $f/d = 1/(4 \tan(\theta_0/2))$.

Improving or optimizing the gain of the antenna system can involve adjusting the parameters (e.g., f, d, h) within the given constraints provided by a microsatellite of a certain size and configuration to achieve an acceptable gain and data transmission rate.

In some embodiments, the antenna feed 102 can be a square structure having a known radiation pattern. The focal length, f, of the reflector 106 can be adjusted once the diameter, d, of the reflector has been selected based on the size of the door 108 or opening. The focal length, f, and depth, h, can be advantageously adjusted such that the antenna feed 102 efficiently illuminates the surface of the reflector 106. The ratio f/d can be advantageously tuned to improve or optimize antenna gain. The properties of the reflector 106 can be adjusted to match the radiation pattern of the antenna feed 102. For example, the diameter, d, focal length, f, and depth, h, of the reflector 106 can be adjusted such that the radiation pattern of the antenna feed 102 illuminates the reflector 106 according to a desired pattern, function, or model.

For example, in an imaging microsatellite having a volume envelope of 60 cm×60 cm×80 cm, the diameter of the antenna reflector can be about 48 cm and the focal length can be about 24 cm, giving a focal ratio, f/d, of about 0.5. The distance from the top surface of the first light baffle 114 to the antenna feed 102 can be about 0.6 cm when the microsatellite is in a non-deployed state. When the microsatellite is in a deployed state, the antenna system can be configured to provide a gain of about 28 dBi and a data transmission rate between about 1 Mbit/s and 100 Mbit/s at a communication frequency between about 8.0 GHz and 8.4 GHz.

An imaging microsatellite having an integrated reflector antenna according to some embodiments described herein can transmit data across one or more (e.g., three) communication channels between about 1 Mbit/s and 100 Mbit/s per channel within the frequency band of about 8.0 GHz to 8.4 GHz. A ground-based communication system with a receiving antenna having a diameter of around 2 m can be sufficient to communicate with an imaging microsatellite having an antenna system according to some embodiments described herein.

Example Method of Deploying an Imaging Microsatellite

Figure 5:
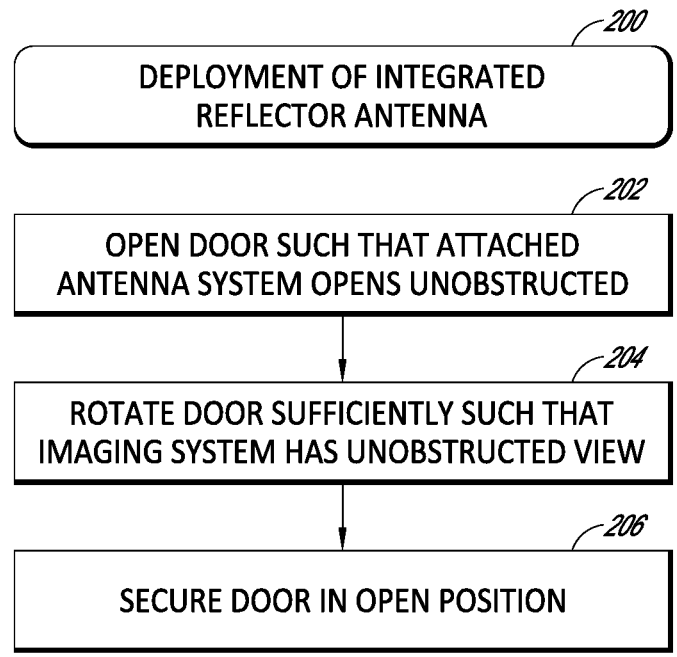
FIG. 5 is a flow diagram representing an example of a method of deploying an integrated reflector antenna system in an imaging microsatellite.

FIG. 5 is a flow chart of a method 200 of deploying an imaging microsatellite according to some embodiments. In operational block 202 the door opens by disengaging a release mechanism. An antenna system can be mounted to the interior side of the door and configured to not disturb, impact, or displace the imaging system when the microsatellite is in a non-deployed state. The antenna system can be configured to not contact or impact the satellite body or other structure when the door opens. The antenna system can be configured to improve or optimize the gain and data transmission rate of the antenna system by adjusting properties of the antenna system such as, e.g., the diameter or focal length of the antenna reflector and/or the curvature of the antenna reflector.

In operational block 206 the door rotates a sufficient amount such that the door and attached antenna system do not obstruct the field of view of an imaging system disposed within the imaging microsatellite. One or more spring hinges can be included on the microsatellite and attached to the door such that they apply a torque or a force to the door to cause it to rotate from a closed position in which the opening door covers the opening to the microsatellite to an open position in which the opening is unobstructed by the door and the imaging system can image a field of view through the door. The field of view can include portions of the Earth over which the microsatellite orbits after launch.

In operational block 208, the door can be substantially secured in an open position using any appropriate method, such as spring hinges, locking mechanisms, magnets, electromagnets, friction, or any combination of these. In the open position, the antenna system can be directed toward the ground so that the microsatellite can communicate images from the imaging system and any other data to a ground receiving station.

The deployment method according to some embodiments, as described herein, advantageously can be relatively simple and reliable due to the simplicity of the mechanical systems involved and the relatively small number of moving parts.

Example Method of Designing an Imaging Microsatellite

Figure 6:
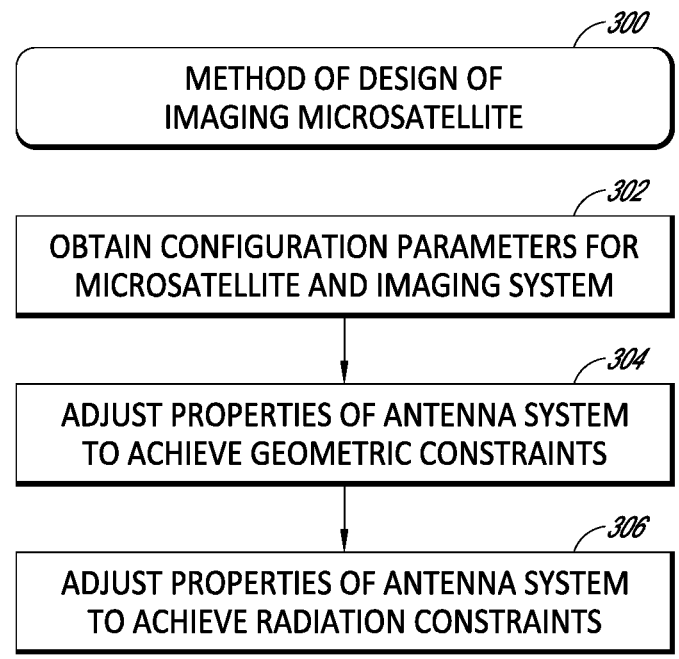
FIG. 6 is a flow diagram representing an example of a method of designing an imaging microsatellite with an integrated reflector antenna system.

FIG. 6 is a flow diagram representing an example of a method 300 of designing an imaging microsatellite with an integrated reflector antenna system. In operational block 302 configuration parameters of a microsatellite can be obtained. The microsatellite can be configured to conform to the ESPA envelope, or other launch vehicle standards. The configuration parameters can include the design, layout, dimensions, and configuration of the microsatellite including the available interior cavity space and opening through which an imaging system can view the Earth. The configuration parameters can also include the design, layout, dimensions, and configuration of the imaging system disposed within the interior cavity of the microsatellite. For example, the imaging system may include a telescope. The imaging system configuration parameters can include information about the size and configuration of the telescope, its primary and secondary (or other) mirrors, the position of telescope supports that secure the primary and secondary mirrors into a desired imaging configuration, and so forth.

In operational block 304, properties of the antenna system can be adjusted such that the antenna system does not impact, contact, or displace the imaging system when the microsatellite is in a non-deployed state in which the antenna system is enclosed within the microsatellite. Properties of the antenna system can include, for example, an aperture of the antenna system, an antenna reflector diameter, an antenna reflector focal length, an antenna reflector depth or curvature, a position or orientation of the antenna feed relative to the antenna reflector, a type of antenna feed, an antenna reflector shape, a configuration of an antenna feed support, or any combination of these. The properties of the antenna system can be adjusted such that the antenna system does not contact or impact the body of the microsatellite, portions of the imaging system, or other structures when the microsatellite is in the non-deployed state. Also, properties of the antenna system can be adjusted such that the antenna system does not contact or impact the body of the microsatellite, portions of the imaging system, or other structures while the microsatellite transitions from the non-deployed state to the deployed state as the door to which the antenna system is attached opens.

In operational block 306, properties of the antenna system can be adjusted to improve or optimize the gain and/or data transmission rate. An antenna reflector and antenna feed can be configured to achieve a desired diameter, d, depth, h, and/or focal length, f. Some or all of these parameters can be adjusted such that the radiation pattern of the antenna feed illuminates or matches the antenna reflector to achieve a desired gain, data transmission rate, link margin, or other communication characteristics of the antenna system. The antenna system gain or data transmission rate can be improved or optimized within the constraints imposed by the installed imaging system by adjusting the focal length, f, diameter, d, and/or depth, h, of the antenna reflector. In some implementations, the antenna system gain or data transmission rate can be improved or optimized while keeping the communication frequency of the antenna in a particular communication band (e.g., 8.0 GHz and 8.4 GHz). For example, in antenna systems that include a paraboloid antenna reflector, improving or optimizing the gain and/or data transmission rate can be accomplished by positioning the antenna feed at the focal point of the antenna reflector and adjusting the focal point of the antenna reflector such that, when the microsatellite is in the non-deployed state, the focal point lies between the primary and secondary mirrors of the imaging system. The ratio f/d can then be adjusted to match the antenna feed radiation pattern thereby improving the antenna system gain or data transmission rate.

The method of design as described herein can provide for a cost-effective imaging microsatellite that may improve or optimize the antenna gain while permitting the antenna system to be stowed within the microsatellite during launch and easily deployed when the microsatellite reaches orbit. For example, the antenna system can be configured to fit within the interior cavity of a microsatellite without disturbing the imaging system and configured to provide sufficient gain and data transmission rates to transfer image and video data to a ground-based communication station.

Additional Examples and Embodiments of Deployed and Non-Deployed Microsatellites and Example Methods of Use As described herein, examples of an imaging microsatellite can include a microsatellite that comprises a microsatellite body having an interior cavity and an opening in the body. The microsatellite body can have an envelope less than about 125 cm by 125 cm by 175 cm or a mass less than about 500 kg. The microsatellite optionally can include an optical seal configured to substantially surround a periphery of the opening. The microsatellite can include a door attached to the microsatellite body. The door can comprise a substantially planar member having an interior surface and an exterior surface. The interior surface of the door optionally can be configured to contact the optical seal when the door is in a closed state. The microsatellite can include one or more hinges connecting the door to the microsatellite body. The microsatellite can include an antenna system that comprises an antenna reflector attached to the interior surface of the door, an antenna feed support attached to the antenna reflector or interior surface of the door, and an antenna feed attached to the antenna feed support. The antenna feed support can be configured to secure the antenna feed in a substantially fixed position relative to the antenna reflector. The microsatellite can include an imaging system disposed within the interior cavity of the microsatellite body. The imaging system can be configured to image a field of view through the opening. The imaging system can include a primary mirror, a secondary mirror, and a secondary mirror support. The secondary mirror support can be configured to secure the secondary mirror in a substantially fixed position relative to the primary mirror. The antenna system can be configured to fit within the interior cavity of the microsatellite when the microsatellite is in a non-deployed state such that the antenna system does not contact or displace the imaging system. The antenna system can be configured to move with the door such that the door can transition from a closed state to an open state in an unobstructed manner when the microsatellite transitions from a non-deployed to a deployed state. The antenna system can be configured to provide a gain greater than or equal to about 25 dBi when the microsatellite is in a deployed state.

Examples of an imaging microsatellite in a deployed state can include a microsatellite comprising a microsatellite body having an interior cavity and an opening in the body. The microsatellite can include a door attached to the microsatellite body, the door comprising an interior surface and an exterior surface. The door can be configured to be secured in an open position by an opening mechanism. The microsatellite can include an antenna system attached to the door. The antenna system can comprise an antenna reflector attached to the interior surface of the door, an antenna feed support attached to the antenna reflector or interior surface of the door, and an antenna feed attached to the antenna feed support. The antenna feed support can be configured to secure the antenna feed in a substantially fixed position relative to the antenna reflector. The microsatellite can include an imaging system disposed within the interior cavity of the microsatellite body. The imaging system can be configured to image a field of view through the opening in the body. The imaging system can comprise a primary mirror, a secondary mirror, and a secondary mirror support. The secondary mirror support can be configured to secure the secondary mirror in a substantially fixed position relative to the primary mirror. The antenna system can be configured to provide a gain greater than or equal to about 25 dBi.

Examples of an imaging microsatellite in a non-deployed state can include a microsatellite comprising a microsatellite body having an interior cavity and an opening in the body. The microsatellite can optionally include an optical seal. The microsatellite can include a door attached to the microsatellite body. The door optionally can be configured to be in contact with the optical seal. The door can be configured to cover the opening in the microsatellite body. The microsatellite can include an antenna system comprising an antenna reflector attached to the door, an antenna feed support attached to the antenna reflector, and an antenna feed attached to the antenna feed support. The antenna feed support can be configured to secure the antenna feed in a substantially fixed position relative to the antenna reflector. The microsatellite can include an imaging system disposed within the interior cavity of the microsatellite. The imaging system can include a primary mirror, a secondary mirror, and a secondary mirror support. The secondary mirror support can be configured to secure the secondary mirror in a substantially fixed position relative to the primary mirror. The antenna system can be configured to fit within the interior cavity of the microsatellite body without contacting or displacing the imaging system.

Examples of a method of transitioning an imaging microsatellite, as described herein, from a non-deployed state to a deployed state can include disengaging a release mechanism. The release mechanism can be configured to secure a door against a body of the microsatellite when engaged. The method can include opening the door wherein the door can include an antenna system attached to an interior surface of the door. The method can include rotating the door such that the door and the integrated reflector antenna do not obstruct a field of view of an imaging system. The method can include securing the door in an open position. The antenna system can be configured to be disposed within an interior cavity of the microsatellite without contacting or displacing the imaging system when the microsatellite is in a non-deployed state.

In some embodiments of the method, the antenna system can be configured to not obstruct the movement of the door during the opening step. The release mechanism can be a frangible bolt configured to be released by fracturing or melting the bolt.

The imaging system can be a telescope, such as, for example, a Cassegrain or Ritchey-Chretien telescope. The integrated reflector antenna can comprise a paraboloid reflector antenna configured to have a focal length, diameter, and curvature such that a desired gain or data transmission rate is provided by the antenna system. The antenna feed can be disposed between the primary and secondary mirrors of the Cassegrain telescope. A diameter of the paraboloid reflector antenna can be less than or equal to about 120 cm or greater than or equal to about 30 cm, or the ratio of the diameter of the reflector to a width of the door can be less than or equal to about 0.98 or greater than or equal to about 0.5.

Explanations of Certain Terms

Envelope is a broad term and is to be given its ordinary and customary meaning to a person of ordinary skill in the art, and includes, without limitation, volume or dimension limitations imposed on satellites for inclusion in a launch vehicle. For example, ESPA defines an envelope of less than or equal to about 90 cm×70 cm×60 cm. As another example, some definitions of small satellites include an envelope of less than or equal to about 125 cm×125 cm×175 cm, less than or equal to about 100 cm×100 cm×150 cm, or less than or equal to about 80 cm×60 cm×60 cm.

Reflector antenna is a broad term and is to be given its ordinary and customary meaning to a person of ordinary skill in the art, and includes, without limitation, any reflector antenna with a surface configured to reflect electromagnetic radiation and substantially redirect it on a desired surface or other antenna element. For example, a parabolic reflector antenna may comprise a paraboloid surface configured to substantially focus incoming collimated radiation onto an antenna feed located at the focus of the paraboloid. Hyperboloidal or other shaped antenna reflectors can be used.

Antenna feed is a broad term and is to be given its ordinary and customary meaning to a person of ordinary skill in the art, and includes, without limitation, an element that emits electromagnetic radiation onto an antenna reflector, an element that absorbs electromagnetic radiation reflected from an antenna reflector, or both. An antenna feed can be, for example, a feed horn, a dipole driven element, waveguide, orthomode transducer, polarizer, and/or any combination of these.

Link margin is a broad term and is to be given its ordinary and customary meaning to a person of ordinary skill in the art, and includes, without limitation, the difference between the received power and the receiver sensitivity in a communication system. Link margin, gain, noise, and bandwidth are all related to the rate at which information can be transmitted across a communication system. For example, as the bit energy per noise density increases, the bit error rate decreases, meaning that increasing the gain and bandwidth while reducing the noise can increase the rate at which data may be transmitted.

Imaging system is a broad term and is to be given its ordinary and customary meaning to a person of ordinary skill in the art, and includes, without limitation, lenses, mirrors, diffraction gratings, prisms, image sensors, optical systems, optical payloads, support structures, light guides, and/or any combination of these which make up a system that focuses and captures an image. An image may comprise pixel data based on photons within a narrow frequency spectrum, a broad frequency spectrum, multiple frequency spectrums, or any combination of these. An imaging system may capture single images or video at various frame rates. An imaging system may be sensitive to photons within the visible spectrum, infrared radiation, ultraviolet radiation, x-rays, gamma rays, microwaves, radio waves, or any combination of these.

SUMMARY

Examples of a microsatellite, integrated antenna, and imaging components have been described with reference to the figures. The components within the figures are not necessarily to scale, with emphasis instead being placed upon clearly illustrating the principles of how to incorporate a suitable integrated reflector antenna into an imaging microsatellite. The examples and figures are intended to illustrate and not to limit the scope of the inventions described herein. For example, the principles disclosed herein may be applied to satellites not classified as microsatellites such as, e.g., large satellites, small satellites, mini-satellites, and so forth.

Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z each to be present.

It should be emphasized that many variations and modifications may be made to the above-described embodiments, the elements of which are to be understood as being among other acceptable examples. All such modifications and variations are intended to be included herein within the scope of this disclosure and protected by the following claims. Further, nothing in the foregoing disclosure is intended to imply that any particular component, characteristic or process step is necessary or essential.

What is claimed is:

1. An imaging microsatellite comprising:
   a movable door configured to:
      cover a radiation entrance to the microsatellite when the door is in a closed position, and
      uncover the radiation entrance to the microsatellite when the door is in an open position;
   an imaging system disposed within the microsatellite, the imaging system configured to receive radiation entering through the radiation entrance when the door is in the open position, the imaging system comprising a primary mirror and a secondary mirror; and
   an antenna system comprising an antenna feed, the antenna system coupled to an interior surface of the door, the interior surface facing the imaging system when the door is in the closed position,
   wherein when the door is in the closed position, the antenna feed is disposed between the primary mirror and the secondary mirror, and
   wherein while the door moves from the closed position to the open position, the antenna feed moves through the opening without contacting any portion of the imaging system or any portion of the imaging microsatellite.

2. The imaging microsatellite of claim 1, wherein the microsatellite has a volume envelope less than or equal to about 125 cm by 125 cm by 175 cm.

3. The imaging microsatellite of claim 1, wherein the microsatellite has a mass less than or equal to about 500 kg.

4. The imaging microsatellite of claim 1, wherein the imaging microsatellite is configured to launch as a secondary payload on a launch vehicle configured to launch a primary payload.

5. The imaging microsatellite of claim 1, wherein the imaging system comprises:
   a primary baffle associated with the primary mirror; and
   a secondary baffle associated with the secondary mirror,
      wherein the antenna feed is disposed between the primary baffle and the secondary baffle when the door is in the closed position.

6. The imaging microsatellite of claim 1, wherein the primary mirror and the secondary mirror are spaced apart by two or more support struts, the antenna feed is supported by a feed support, and the feed support extends between two adjacent support struts when the door is in the closed position.

7. The imaging microsatellite of claim 1, wherein the antenna feed comprises one or more of a feed horn, a dipole driven element, a waveguide, an orthomode transducer, or a polarizer.

8. The imaging microsatellite of claim 1, wherein the antenna system comprises an antenna reflector having a diameter d and focal length f, and a ratio f/d matches a radiation pattern of the antenna feed.

9. The imaging microsatellite of claim 1, wherein the antenna system comprises an antenna reflector, and a ratio of a diameter of the antenna reflector to a width of the door is greater than about 50%.

10. The imaging microsatellite of claim 1, further comprising a release mechanism configured to release the door and allow the door to move from the closed state to the open state.

11. The imaging microsatellite of claim 1, wherein the antenna system is configured to provide a gain in a range from about 10 dBi to about 30 dBi.

12. The imaging microsatellite of claim 1, wherein the antenna system is configured to provide a data transmission rate between about 1 Mbit/s and 100 Mbit/s.

13. The imaging microsatellite of claim 1, wherein the antenna system is configured to transmit data across one or more communication channels within a band of frequencies between about 8.0 GHz and about &4 GHz.

14. The imaging microsatellite of claim 1, wherein the antenna system is configured to transmit imaging data acquired by the imaging system when the door is in the open position.

15. The imaging microsatellite of claim 1, further comprising one or more solar panels configured to provide power to electrical components in the microsatellite.

* * * * *